DeW. C. BAKER.
Moisture and Pressure Pad for Horses' Hoofs.
No. 221,272.   Patented Nov. 4, 1879.
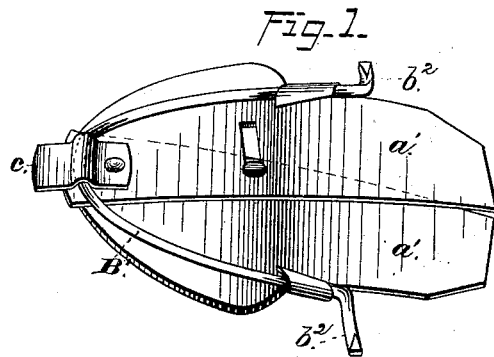
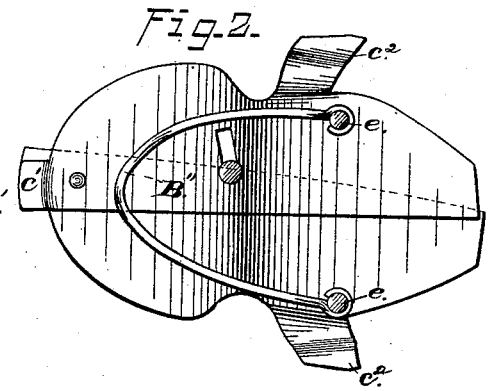
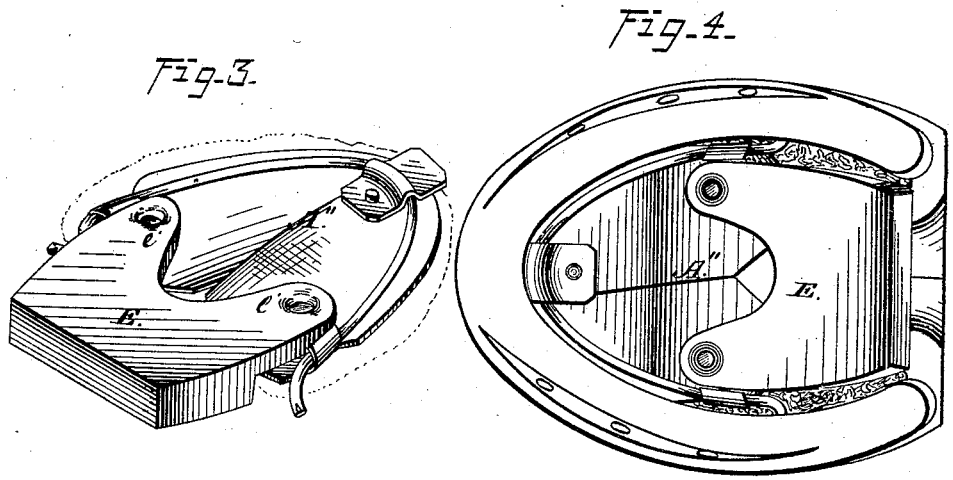
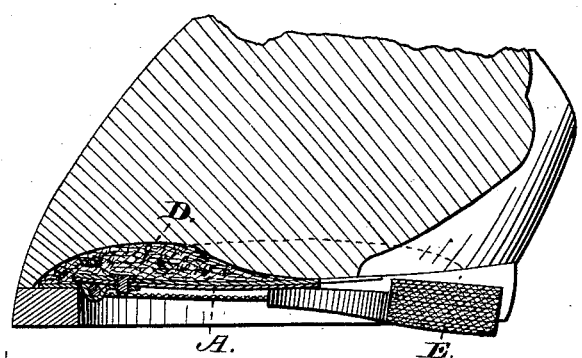
WITNESSES:
Jas. E. Hutchinson.
J. A. Rutherford
INVENTOR.
DeWitt C. Baker,
by James L. Norris,
Attorney.

UNITED STATES PATENT OFFICE.

DE WITT C. BAKER, OF BUFFALO, NEW YORK.

IMPROVEMENT IN MOISTURE AND PRESSURE PADS FOR HORSES' HOOFS.

Specification forming part of Letters Patent No. 221,272, dated November 4, 1879; application filed August 19, 1879.

*To all whom it may concern:*

Be it known that I, DE WITT C. BAKER, of Buffalo, in the county of Erie and State of New York, have invented certain new and useful Improvements in Moisture and Pressure Pads for Horses' Hoofs, of which the following is a specification.

This invention relates to certain improvements in moisture and pressure pads for horses' hoofs.

Its object is to enable the application of such moisture and pressure to the frog, heel, and other portions of the sole of a horse's foot as will serve in lieu of the natural effect of the earth, and prevent contraction of the hoof, which is commonly the result of standing for a long time upon smooth hard floors of stables, upon street-pavements, and other places where the animal's foot does not come in contact with the moist cushion-like surface of the ground.

It consists in an edgewise-expansible metallic plate made in two parts, which, when united, have the approximate shape of the interior space of a horseshoe, and provided with fingers to extend over the upper inner margin of the shoe upon a hoof, the fingers supporting the plate in position under the frog and cavity of the foot, where it serves as a rest for a sponge or similar soft absorbent material, which is thereby kept in contact with and gives moisture to the sole.

It further consists in the combination, with a supporting-plate adapted for insertion into and provided with fingers for its support within a horseshoe, of an elastic water-absorbent cushion resting upon said plate, and adapted to be thereby held under pressure against the frog and snugly within the cavity of a horse's foot, whereby moisture and pressure may at the same time be applied in lieu of the contact of the ground, and contraction of the hoof and other hoof diseases thereby prevented.

It consists, also, in the combination, with a plate constructed as above described, of an elastic pad attached to the rear end thereof in proper position to stand directly under and support a horse's heel when the plate is in position, as above set forth.

In the accompanying drawings, Figure 1 is a bottom perspective view of the edgewise-expansible plate. Fig. 2 is a bottom view of a modification of same. Fig. 3 is a perspective view of another modification of the plate with the heel-pad attached. Fig. 4 is a bottom view of a shod horse's foot with my invention applied thereto. Fig. 5 is a section taken in a plane from front to rear through the hoof and shoe shown in Fig. 4.

Referring to Fig. 1, the letter $A'$ designates the edgewise-expansible plate. Its expansibility is secured by forming it of two halves, $a'$ $a'$, pivoted together at their front ends, and forced from each other at their rear ends by a spring, $B'$, the arms of which act on the two parts $a'$ $a'$, respectively. To the front of the plate $A'$ is secured a forward-projecting finger, $c$, which also serves to sustain the spring in position.

The rear ends of the spring-arms are bent outward to form fingers $b^2$ $b^2$, and secured to the plate by ears cut and bent over from the edge of the latter. When in position for use the finger $c$ extends over the upper inner margin of the front portion of the shoe, and the fingers $b^2$ $b^2$ are forced by the spring over the rear portions of the said shoe, as shown in Fig. 4.

The letter D indicates the elastic water-absorbent cushion, which rests upon the plate and is held thereby compressed into the cavity and against the frog of the foot. This cushion must be dipped in water or a medicinal liquid before being applied to the foot.

The absorbent cushion may be placed in position separately, and the plate then arranged to support it.

To the rear end of the plate $A''$, Figs. 3, 4, and 5, is secured an elastic heel-plate, E, which I preferably form of india-rubber, and arrange it to stand directly under and support the heel. This plate should be somewhat thicker than the shoe, in order that it may be compressed when the foot is set down, and this compression causes the desired pressure upon the heel, where it should be ordinarily greater than at any other part of the sole.

The rubber pad or plate is cleft or bifurcated to form arms $e'$ $e'$, which are respectively riveted to the two sections of the plate, and readily permit the compression of said plate.

In some cases it may be unnecessary to use the heel-pad, and in such case a longer plate, as shown in Figs. 4 and 5, may be used.

In the modification shown in Fig. 2 the front supporting-finger, $c'$, is composed of two projections, each formed in one piece with one of the parts of the plate, and the rear fingers, $c^2$, are also each formed in one piece with a portion of the plate, and the spring $B''$ does not project beyond the plate, but is secured thereto by headed studs $c$.

What I claim is—

1. An edgewise-expansible metallic plate made in two parts, which, when united, have the approximate shape of the interior space of a horseshoe, and provided with fingers to extend over the upper inner margin of the shoe upon a hoof, substantially as and for the purpose set forth.

2. The combination, with the plate adapted to fit and be supported within the horseshoe, of the elastic heel-pad, substantially as and for the purpose set forth.

3. The combination, with the pivoted sections of the plate, of the cleft or bifurcated spring heel-pad, substantially as described.

In testimony that I claim the foregoing I have hereunto set my hand in the presence of the subscribing witnesses.

DE WITT C. BAKER.

Witnesses:
 GEO. F. HAYWOOD,
 W. B. SINET.